No. 783,545. PATENTED FEB. 28, 1905.
T. F. ROWLAND.
CORRUGATING MACHINE.
APPLICATION FILED MAR. 19, 1904.

5 SHEETS—SHEET 1.

WITNESSES:
Jessie B. Kay
Clara Wiederhold

INVENTOR
Thomas F. Rowland
BY
Duncan & Duncan ATTORNEYS

No. 783,545. PATENTED FEB. 28, 1905.
T. F. ROWLAND.
CORRUGATING MACHINE.
APPLICATION FILED MAR. 19, 1904.

5 SHEETS—SHEET 2.

WITNESSES:
Jessie B. Kay.
Clara Wiederhold.

INVENTOR
Thomas F. Rowland
BY
Duncan & Duncan ATTORNEYS

No. 783,545. PATENTED FEB. 28, 1905.
T. F. ROWLAND.
CORRUGATING MACHINE.
APPLICATION FILED MAR. 19, 1904.
5 SHEETS—SHEET 3.
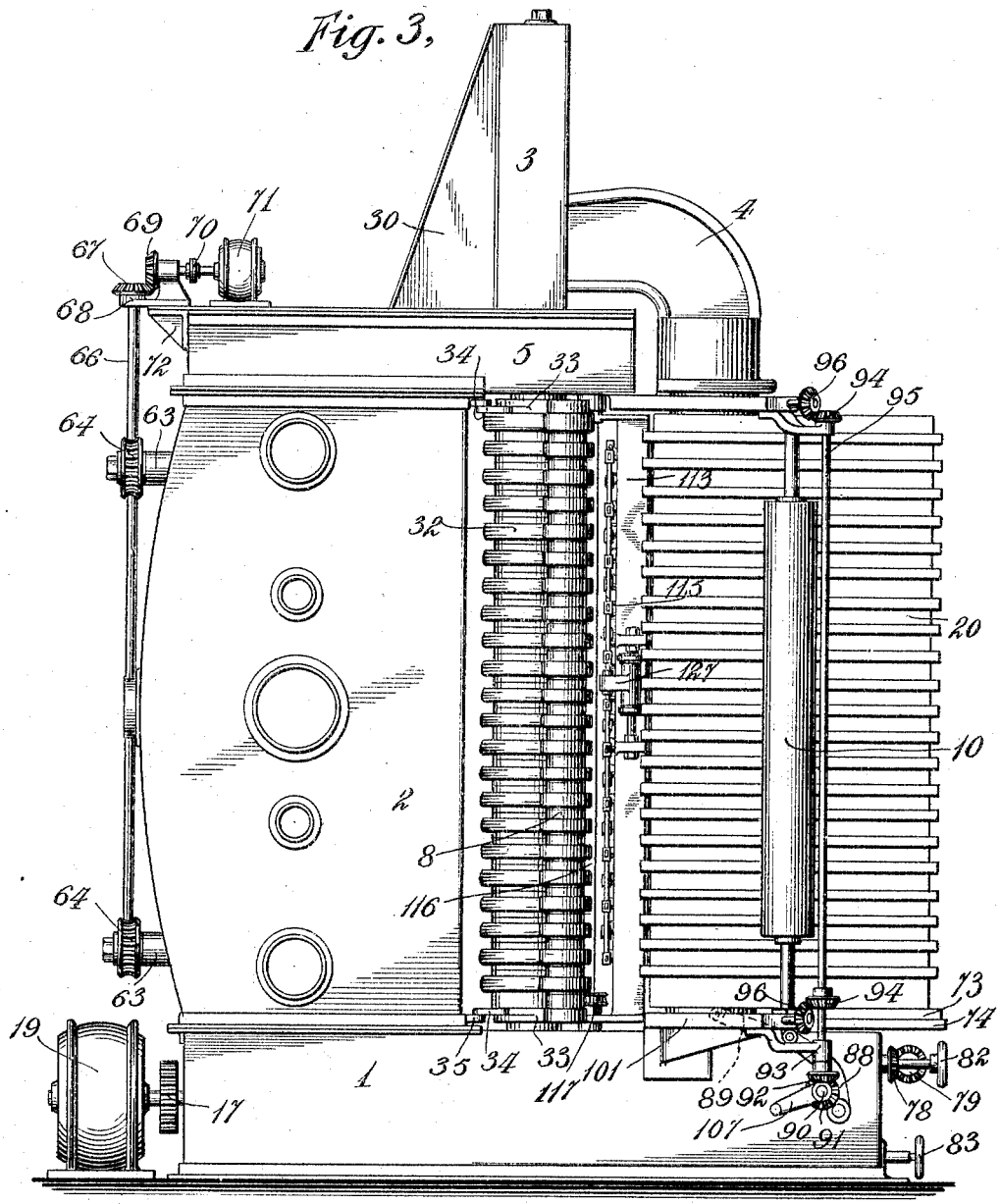

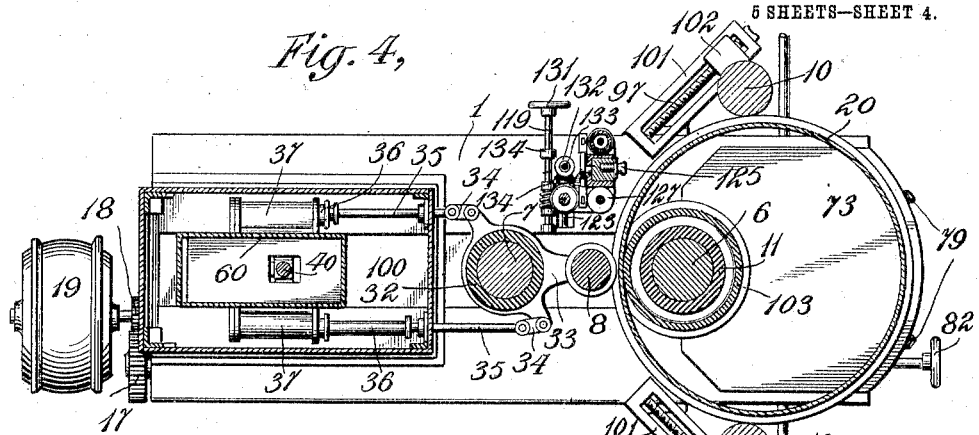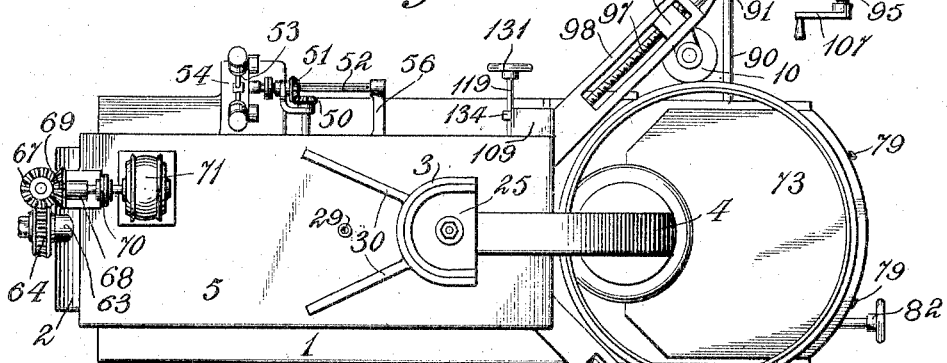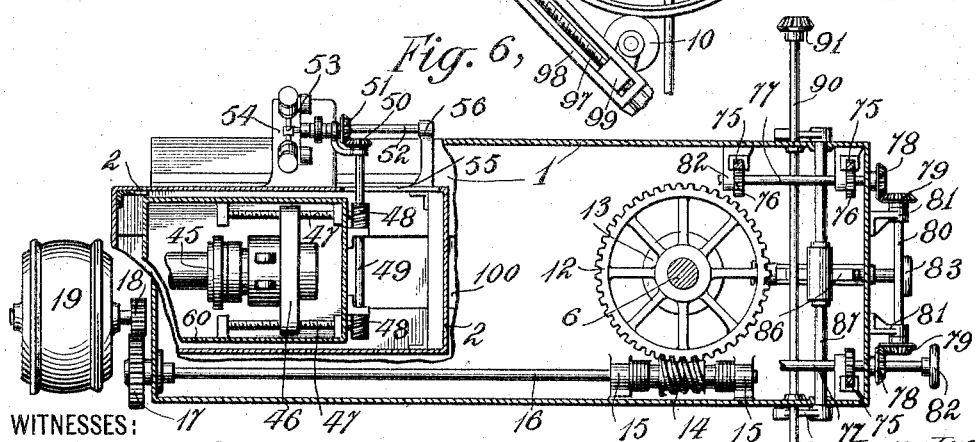

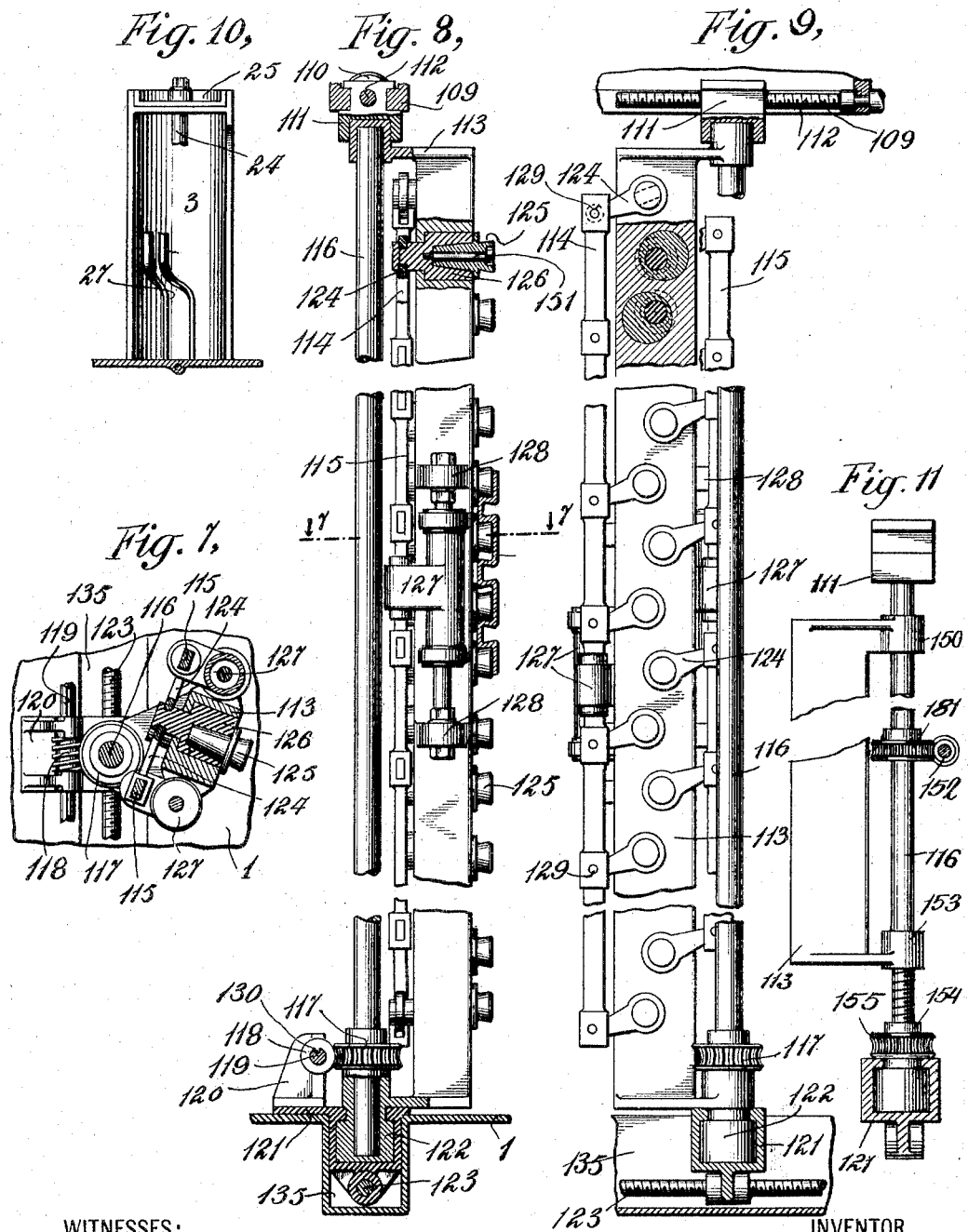

No. 783,545.

Patented February 28, 1905.

UNITED STATES PATENT OFFICE.

THOMAS F. ROWLAND, OF NEW YORK, N. Y.

CORRUGATING-MACHINE.

SPECIFICATION forming part of Letters Patent No. 783,545, dated February 28, 1905.

Application filed March 19, 1904. Serial No. 198,900.

*To all whom it may concern:*

Be it known that I, THOMAS F. ROWLAND, a citizen of the United States, and a resident of New York city, in the county and State of New York, have invented certain new and useful Improvements in Corrugating-Machines, of which the following is a specification, taken in connection with the accompanying drawings, which form a part of the same.

This invention relates to corrugating-machines, and relates especially to machines for forming undercut corrugations in sheet-metal cylinders.

In using the illustrated embodiment of this invention corrugations having arched ridges are first formed. These arched ridges are flattened to form substantially crenelated corrugations, and these corrugations are thereupon acted upon by a spinning mechanism to finish them and complete their undercut contour.

Figure 1:
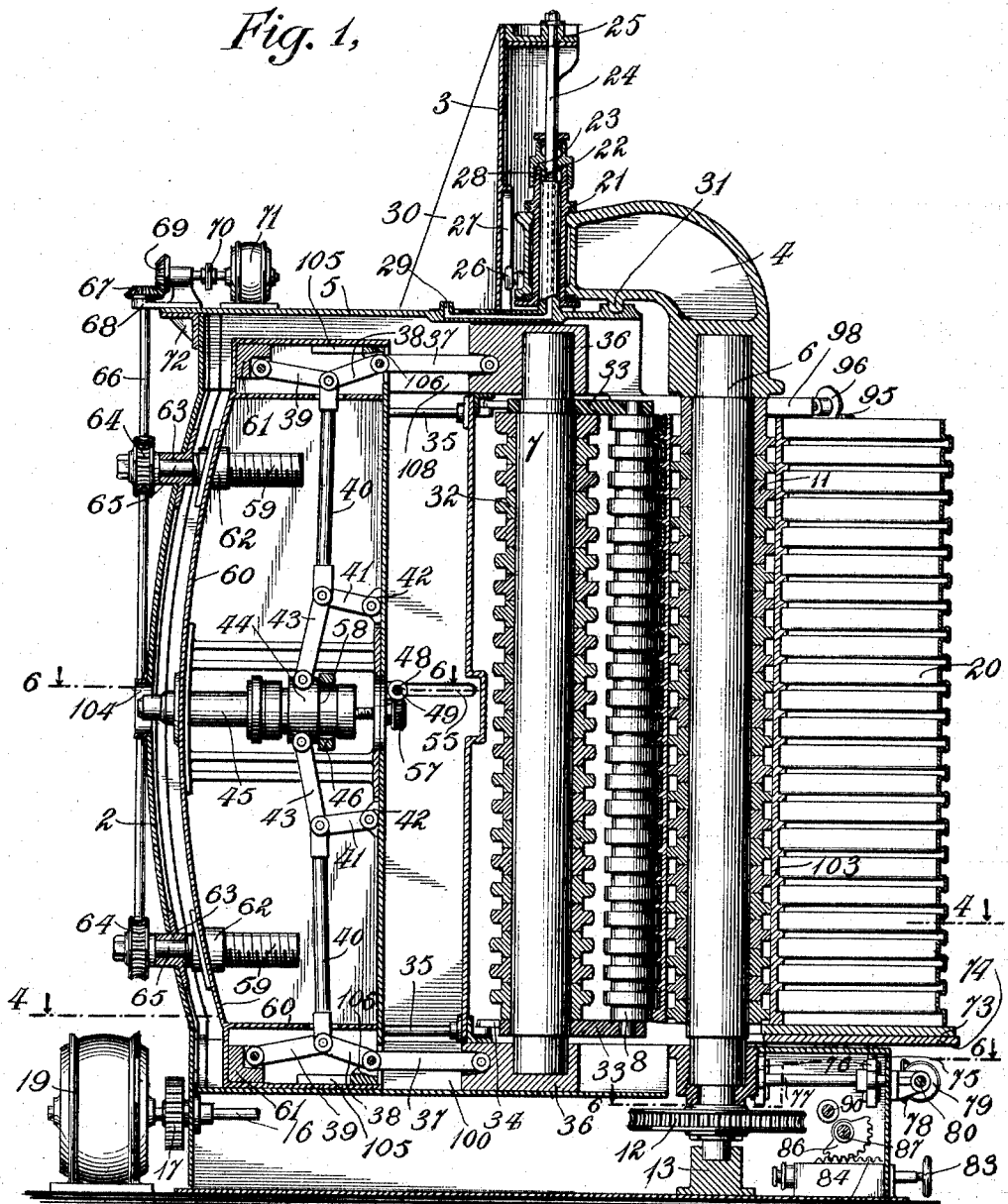
Figure 2:
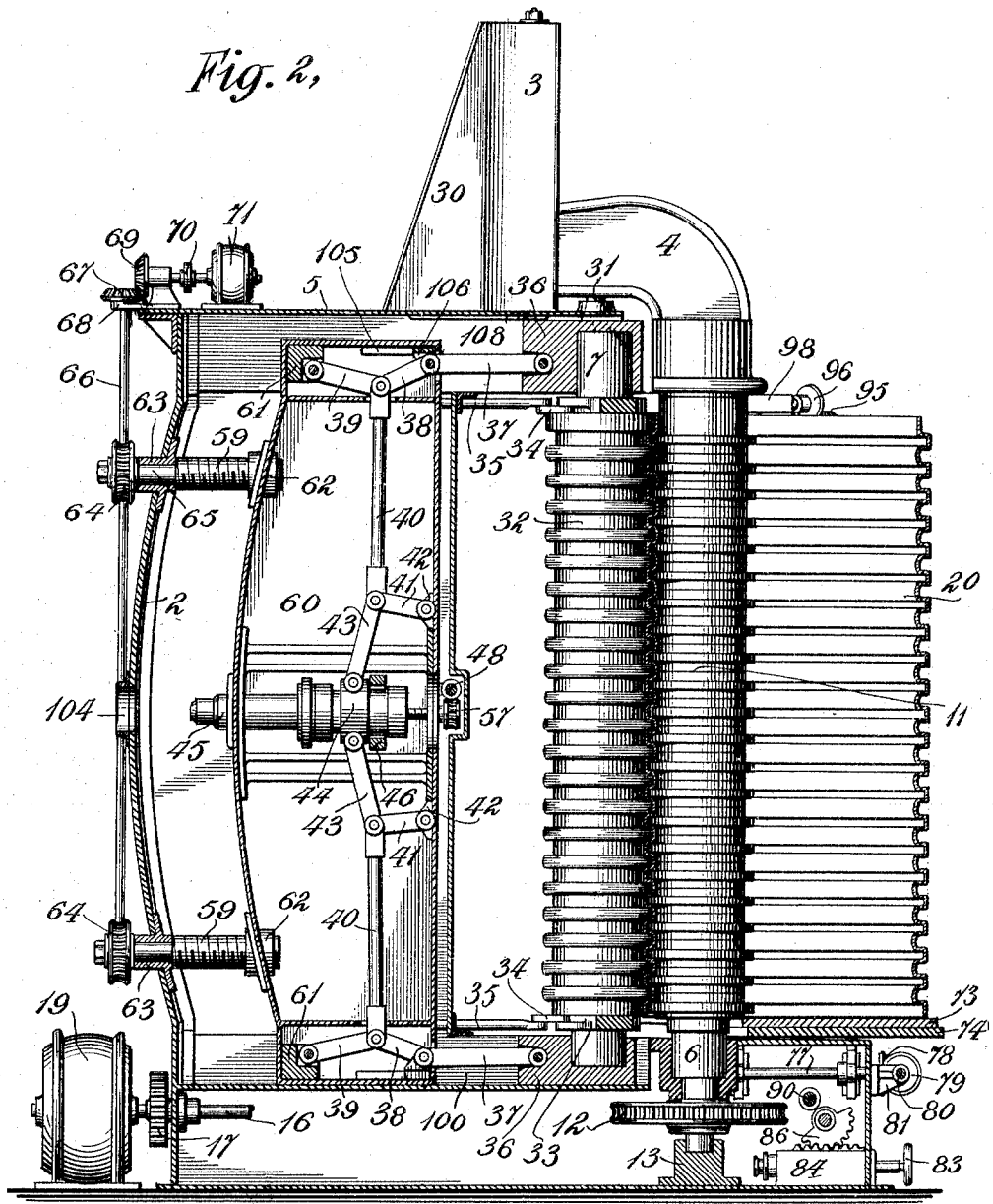

In the accompanying drawings, in which the same reference-numeral refers to similar parts in the several figures, Figure 1 is a vertical sectional view of an embodiment of this invention, the machine being indicated as flattening the arched corrugations. Fig. 2 is a similar view in which the machine is indicated as forming the primary arched corrugations. Fig. 3 is a side elevation. Fig. 4 is a horizontal sectional view of the machine as shown in Fig. 1. Fig. 5 is a plan view of the same. Fig. 6 is a similar view taken substantially on the line 6 6 of Fig. 1. Figs. 7, 8, 9, and 11 are details of the spinning mechanism, and Fig. 10 is a detail of the head.

A heavy frame is used to support the various parts of this machine, preferably comprising the base 1, the pillar 2, and the entablature 5, upon which the head 3 is mounted, these parts all being rigidly joined, as indicated in Figs. 1 and 3, the bracing-piece 30 being used to support the head. The driving-roll 11 is formed with suitable corrugations and may be built up, if desired, by rigidly securing a number of rings of the desired shape upon the spindle 6. The lower end of this spindle is supported in a suitable bearing in the base of the machine, and the stepped bearing 13 may be used, if desired. The worm-wheel 12 is secured to this spindle and is engaged by the worm 14, rigidly secured upon the shaft 16, which is mounted in suitable bearings 15 in the frame, as indicated in Fig. 6. The gear 17 on this shaft is engaged by the driving-pinion 18 of the electric motor or other driving means 19, so that in this way the driving-roll may be rotated at the speed desired. The sleeve 103 is formed so as to loosely engage the driving-roll and serves to shroud the corrugations in this roll when the machine is used in flattening or spinning the corrugations formed in the cylinder. This sleeve is preferably constructed with a series of alining collars, as indicated, which are adapted to enter the corrugations of the cylinder 20 and secure the alinement of these corrugations as they are flattened. These alining collars may, however, be omitted and the flattening-roll have a plain cylindrical form.

The top of the spindle 6 operates in a bearing in the cap 4, this cap being formed with the lug or projection 31, adapted to engage a suitable recess in the entablature to rigidly support the upper end of the spindle in operative position. This cap is formed with a sleeve which incloses the hydraulic cylinder 21, which works upon the piston 24, rigidly secured to the top 25 of the head. The enlarged lower portion of this piston operates within the cylinder, the upper end of which is closed by the cylinder end 23, formed with stuffing-boxes, as usual. In this way an annular water-space 28 is formed which communicates, through the opening 22 in the piston, with the inlet 29, so that when water or other fluid under hydraulic pressure is admitted to this inlet it flows into the cap-cylinder and raises the cap away from the spindle of the driving-roll. The cap is formed with the guide-roll 26, which engages the cam-groove 27 in the inside of the head, this groove being preferably given the curved contour indicated in Fig. 10. In this way the head rises in a vertical direction until it is clear of the spindle 6, and thereafter it is given a partial rotation of the desired extent to swing it clear of the spindle and the cylinder on the driving-roll. Upon allowing the discharge of fluid from the hydraulic cylinder the cap descends by its own weight, or, if desired, positive means may be employed in some cases to assist its desired movement in which it swings into position over the spindle and thereafter descends upon it.

The traverse-roll 32 may have a built-up construction similar to the driving-roll 6 and may be formed by rigidly securing a series of rings to the spindle 7. This spindle is indicated as mounted in the boxes 36, which move in suitable guides in the frame and which may be traversed toward and from the driving-roll by suitable traverse-gear of any description. In Fig. 1 the traverse-bars 37 are indicated as pivoted to the boxes and are pivoted at their other ends to the blocks 106, which move in the guides 105 in the yoke 60. These blocks are also connected with the toggle-links 38 39, the links 39 being pivoted to move about the stationary blocks 61 in the yoke. The way-bars 40 are pivoted to the toggle-links, as indicated, and their inner ends are pivoted to the distance-pieces 41, which swing about pins in the lugs 42 of the yoke. The links 43 connect these way-bars with the traverse-cylinder 44, mounted upon the differential piston 45 and operated as described in my Patent No. 737,277, granted August 25, 1903. A suitable stop 46 is preferably provided to limit the inward movement of the traverse-cylinder, this stop being operated by the screws 47, having the worm-wheels 57 secured thereto. These worm-wheels are engaged by the worms 48 on the shaft 49 passing through the slot 55 in the frame and which is connected by the bevel-gears 50 51 with the shaft 52 of the air-engine or other motor 53, mounted on an extension 54 of the frame, as indicated in Figs. 5 and 6. The bevel-gear 51 is splined to the shaft 52, so that it is allowed to move along this shaft and is held in engagement with the coöperating bevel-gear at all times. This stop and traverse mechanism operates, as described in my patent referred to, so that the traverse-roll is actuated under hydraulic pressure through the toggle connections, which traverse the roll toward or from the driving-roll, the forward movement of this traverse-roll being positively limited by the stop, which may be adjusted from time to time to allow the desired extent of movement of the parts.

The yoke 60 is supported at either end in suitable guides in the frame, and this yoke is engaged by the adjusting-screws 59, which coöperate with suitable nuts 62 in the yoke, the shanks 65 of these screws passing through the sleeves 63 in the pillar 2 of the frame and having the worm-wheels 64 secured to them. Each of these worm-wheels is engaged and operated by a worm on the worm-shaft 66, which rotates in a suitable bearing 68 in the frame and is operated by the beveled gears 67 69 from the shaft 70 of the electric motor or other driving device 71. By this means the adjusting-screws 59 may be rapidly rotated in unison and operate to quickly adjust the position of the yoke and its traverse mechanism and the connected traverse-roll, the end of the piston 45 passing through an aperture 104 in the pillar, as indicated.

The flattening-roll 8, which may be of such size as to be always in contact with and reinforced by the traverse-roll, is mounted in suitable bearings in the cranks 33, journaled about the spindle 7 of the traverse-roll. These cranks are operated by the pistons 36, which move in the hydraulic cylinders 37, secured to the yoke, the rods 35 being connected by the links 34 with the cranks 33. In this manner the flattening-roll may be swung into the operative position shown in Figs. 1 and 4 or may be swung to one side, so that the yoke and traverse-roll may be bodily adjusted to the position indicated in Fig. 2 and the roll thereupon traversed into forcible engagement with the driving-roll, the parts assuming the position indicated in Fig. 2.

The spinning-boxes 111 and 121 are mounted in suitable guides 109 and 135 in the frame, as indicated in Figs. 8 and 9, so as to slide therein, these boxes serving to support the ends of the spinning-shaft 116. The box 111 is indicated as engaged by the adjusting-screw 112, which may be rotated in any desired way and which serves to adjust the position of the box and the spinning-block secured thereto. A similar adjusting-screw 123 engages the lower box and adjusts the lower end of the spinning-shaft and box in a similar manner. The spinning-block 113 is eccentrically mounted about the shaft 116 and is formed with the worm-wheel 117, which is engaged by the worm 118, connected by the spline 130 with the shaft 119 in the bracket 120. As indicated in Fig. 4, this shaft is provided with the operating-wheel 131, and by rotating this wheel the worm-gear oscillates the spinning-block about the shaft 116. A number of sleeves 126 are mounted in the spinning-block, and every alternate sleeve, as is indicated in Fig. 9, is connected by the cranks 124 to the pins 129 in the operating-rod 114, so that the sleeves are rotated in unison by moving the rod. The other sleeves are provided with similar cranks 124, which are pivoted to the other operating-rod, 115. Each of these operating-rods is reciprocated by the hydraulic cylinder 127, secured thereto and provided with a suitable piston, which is connected with the lugs 128 on the block. A spinning-roll 125 is eccentrically mounted in each of the sleeves, the rolls being preferably provided with tapering shanks fitting within correspondingly-shaped bearings in the sleeves, the rolls being preferably held in position by suitable bolts 151, which may be used in connection with washers at their outer ends to allow the free rotation of the spinning-rolls. It will be seen by reference to Figs. 8 and 9 that by operating the rods and rotating the sleeves in which the spinning-rolls are mounted the two rolls of each pair may be made to approach each other and engage the opposite faces of the corrugated cylinder, as seen in Fig. 8. If, however, the sleeves are rotated in the opposite direction by the connecting mechanism described, the spinning-rolls will be moved out of engagement with these lateral faces of the corrugations and will engage and operate upon the opposite faces of the alternate corrugations of the cylinder. If desired, the spinning-block may be mounted so as to be vertically adjustable. This may be accomplished by forming the lower end of the shaft 116 with a suitable thread which is engaged by the threaded nut 154, which is rotatably mounted in the spinning-box 121. The worm-wheel 155, integral with this nut, serves to rotate it as desired, and thus to vertically adjust the shaft 116, the upper end of this shaft passing loosely through a hole in the spinning-box 111. The spinning-block 113 is secured to the shaft 116 by the inclosing sleeves 150 153, which are rigidly connected therewith, and the shaft and block are oscillated by the worm-wheel 181 on the shaft, which is engaged and rotated by the worm 152.

Suitable adjusting-rolls, which may take the form indicated in Figs. 3 and 4, may be used to keep the corrugated cylinder 20 in proper position as it is rotated by the driving-roll. The guide-rolls are adjustable in the frame and are guided so that they engage cylinders of varying size at substantially diametrical points, so that the cylinders are accurately guided in all cases during their rotation. These guide-rolls 10 are mounted in suitable bearings in the blocks 99, these blocks being mounted in the guides 98, secured to the frame and being engaged by the adjusting-screws 97. As indicated, each of these adjusting-screws is provided with the beveled gear 96, secured thereto, and the cooperating-gears 94 on the connecting-shafts 95 operate all these adjusting-screws in unison, the shafts 95, which are mounted in the bearings 93, being connected by the beveled gears 91 92 with the transverse operating-shaft 90, which may be rotated by the crank 107, (indicated in Figs. 3 and 4,) although it is of course understood that these guide-rolls may be adjusted in any other desired way.

A vertically-adjusted platform 74 is mounted upon a series of rods 75, which are shown in Fig. 6 as engaged by the pinions 76 on the shafts 77, which run in the bearings 82. These shafts are provided with the beveled gears 78, meshing with the gears 79 on the shaft 80, which runs in the bearings 81, so that in this way by operating the hand-wheel 82 or other operating device all the racks on the rods are simultaneously operated and raise and lower the platform in a parallel manner. The movable table 73 is mounted in suitable slides on the platform and is operated by the links 89, shown in Fig. 3 as connected with the rock-arms 88. These arms are connected to the shaft 87, shown in Fig. 1 as provided with the toothed segment 86, meshing with the rack 85 on the hydraulic cylinder 84, which is operated to move the table as described in my patent referred to, the extent of motion of these parts being regulated by the hand-wheel 83.

In operating this machine a suitable cylindrical blank, preferably formed of welded sheet metal and heated to the desired extent, is slipped over the driving-roll and the traverse-roll moved up into engagement with the blank, which is rotated by the driving-roll. Corrugations of the arched form indicated in Fig. 2 may thus be formed in the cylinder 20. Thereupon the traverse-roll and yoke are withdrawn and the cap 4 is raised and swung aside and the sleeve 103 dropped over the driving-roll, so as to shroud the corrugations therein. The flattening-roll is then swung forward into the position indicated in Figs. 1 and 4, and the traverse mechanism is thereupon operated so as to press the cylinder between the flattening-roll and the shrouded rotating driving-roll, the arched corrugations being preferably flattened into the undercut crenelated form indicated in Fig. 1. Thereafter the spinning-head is oscillated from its inoperative position (indicated in Fig. 4) into engagement with the corrugated cylinder and the spinning-rolls are forced into engagement with the lateral faces of the rotating cylinder, these rolls operating to burnish the corrugations and finish them in their undercut form. It is not necessary in all cases to withdraw the flattening-roll while the spinning operation is taking place, although this may be done in some cases. It is in all cases desirable, however, to maintain the guiding-rolls 10 in engagement with the cylinder, so as to secure its regular rotation of the cylinder, and for the same reason the table on which the cylinder is supported should be kept in proper vertical position at all times.

It is of course understood by those familiar with this art that many variations in the form, proportions, and numbers of parts of this machine may be made. Parts of the same may be employed without using the whole, and parts may be employed in connection with other devices without departing from the spirit of this invention or losing the advantages of the same. I do not, therefore, desire to be limited to the details of the disclosure which has been made in this case; but what I claim as new, and desire to secure by Letters Patent, is set forth in the appended claims.

I claim—

1. In combination, a frame, a vertical corrugated driving-roll revolubly mounted in said frame, a cap to support the upper end of said driving-roll and means to lift and swing said cap out of line with said roll, a shrouding-sleeve provided with alining collars to removably engage said driving-roll, a yoke movably mounted in said frame, adjusting means engaging said yoke, traverse-gear mounted on said yoke, a traverse-roll connected with said gear to be operated thereby, a flattening-roll movably mounted on said traverse-roll and means to move said flattening-roll into position to coöperate with said driving-roll, a spinning-block movably mounted in said frame, a series of spinning-rolls mounted in said block and operating means connected with said spinning-rolls to simultaneously adjust their relative positions.

2. In combination, a frame, a vertical corrugating-roll revolubly mounted in said frame, a cap to disengageably support the upper end of said roll and to allow a metal cylinder to be slipped over the same, a relatively movable traverse-roll to coöperate with said roll and form corrugations in said cylinder, a relatively movable flattening-roll to engage said corrugations and means adjacent said corrugating-roll to coöperate with said flattening-roll to flatten said corrugations.

3. In combination, a frame, a corrugating-roll mounted in said frame, a cap to detachably support one end of said roll to allow a metal cylinder to be slipped over the same, a relatively adjustable roll coöperating with said corrugating-roll to form corrugations in said cylinder, a relatively adjustable flattening-roll to engage said corrugations while said cylinder is upon said corrugating-roll to flatten said corrugations.

4. In combination, a corrugating-roll, a relatively movable traverse-roll to coöperate with said corrugating-roll, a flattening-roll, means adjacent said corrugating-roll to coöperate with said flattening-roll and to flatten said corrugations, an adjustable spinning-block and spinning-rolls in said block to engage said corrugations.

5. In combination, a corrugating-roll, a relatively adjustable roll to coöperate with said corrugating-roll and to form corrugations in a metal cylinder when in position upon said corrugating-roll, a removable sleeve to engage said corrugating-roll and shroud the corrugations therein, and a relatively adjustable flattening-roll to coöperate with said shrouded corrugating-roll to flatten the corrugations in said cylinder.

6. In combination, a corrugating-roll, a relatively adjustable roll to coöperate with said corrugating-roll and to form corrugations in a metal cylinder when in position upon said corrugating-roll, a removable sleeve formed with alining collars to engage said corrugating-roll and shroud the corrugations therein, and a relatively adjustable flattening-roll to coöperate with said shrouded corrugating-roll to flatten the corrugations in said cylinder.

7. In combination, a frame, a vertical corrugating-roll mounted in said frame, a cap to detachably support one end of said corrugating-roll, a relatively adjustable roll to coöperate with said corrugating-roll to form corrugations in a metal cylinder when in position on said corrugating-roll, a detachable sleeve to fit over said corrugating-roll to shroud the corrugations therein and a flattening-roll to coöperate with said shrouded corrugating-roll to flatten the corrugations in said cylinder.

8. In combination, a corrugating-roll, a relatively adjustable roll to coöperate with said corrugating-roll and to form corrugations in a metal cylinder when in position upon said corrugating-roll, a removable sleeve to engage said corrugating-roll and shroud the corrugations therein, a relatively adjustable flattening-roll to coöperate with said shrouded corrugating-roll to flatten the corrugations in said cylinder, an adjustable spinning-block, and spinning-rolls in said block to engage said corrugated cylinder while it is in position on said corrugating-roll.

9. In combination, a corrugating-roll, a relatively adjustable roll to coöperate with said corrugating-roll and to form corrugations in a metal cylinder when in position upon said corrugating-roll, a removable sleeve formed with alining collars to engage said corrugating-roll and shroud the corrugations therein, a relatively adjustable flattening-roll to coöperate with said shrouded corrugating-roll to flatten the corrugations in said cylinder, an adjustable spinning-block, and spinning-rolls in said block to engage said corrugated cylinder while it is in position on said corrugating-roll.

10. In combination, a frame, a vertical corrugating-roll mounted in said frame, a cap to detachably support one end of said corrugating-roll, a relatively adjustable roll to coöperate with said corrugating-roll to form corrugations in a metal cylinder when in position on said corrugating-roll, a detachable sleeve to fit over said corrugating-roll to shroud the corrugations therein, a flattening-roll to coöperate with said shrouded corrugating-roll to flatten the corrugations in said cylinder, an adjustable spinning-block, and spinning-rolls in said block to engage said corrugated cylinder while it is in position on said corrugating-roll.

11. In combination, a frame, a corrugating-roll revolubly mounted in said frame, a cap to detachably support one end of said corrugating-roll, a corrugated traverse-roll, a yoke, means to adjust said yoke in said frame, traverse-gear in said yoke to adjust said traverse-roll relatively to said corrugating-roll, a flattening-roll connected with said traverse-roll and relatively movable with respect thereto to engage the corrugations in a metal cylinder.

12. In combination, a frame, a corrugating-roll mounted in said frame, a yoke movably mounted in said frame, means to adjust the position of said yoke, traverse-gear mounted on said yoke, a traverse-roll connected with said gear to coöperate with said corrugating-roll, a flattening-roll swingingly mounted with respect to said traverse-roll and means to move said flattening-roll into operative position adjacent said corrugating-roll.

13. In combination, a frame, a corrugating-roll in said frame, a relatively adjustable roll coöperating with said corrugating-roll to form corrugations in a metal cylinder upon said corrugating-roll, means to flatten the corrugations formed in said cylinder, an adjustable spinning-block and spinning-rolls in said block to engage the corrugations in said cylinder while it is in position on said corrugating-roll.

14. In combination, a frame, a corrugating-roll mounted in said frame, means coöperating with said corrugating-roll to form corrugations in a metal cylinder, means to flatten said corrugations while said cylinder is in position on said corrugating-roll, a spinning-block and spinning-rolls mounted in said block to engage said corrugations while said cylinder is upon said corrugating-roll.

15. In combination, a frame, a corrugating-roll mounted in said frame, means coöperating with said roll to form corrugations in a metal blank, a relatively adjustable spinning-block, sleeves mounted in said block, spinning-rolls eccentrically mounted in said sleeves and means to rotate said sleeves to bring said rolls into engagement with the corrugations formed in said blank.

16. In combination, a frame, adjustable boxes mounted in said frame, a spinning-shaft in said boxes, a spinning-block secured to said shaft, means to swing said block about said shaft into adjusted position, a series of sleeves in said block, spinning-rolls eccentrically mounted in said sleeves, cranks and hydraulically-operated rods connected to said sleeves to rotate the alternate sleeves in unison to relatively adjust the position of said spinning-rolls.

17. In combination, a spinning-block, a series of sleeves in said block, spinning-rolls eccentrically mounted in said sleeves and means to rotate part of said sleeves in unison to secure the relative adjustment of said spinning-rolls.

18. In combination, a spinning-block, a sleeve mounted in said block, a spinning-roll eccentrically mounted in said sleeve, means to rotate said sleeve to adjust the position of said spinning-roll with respect to adjacent spinning means.

19. In combination, a frame, a roll in said frame to engage a metal cylinder, angularly-disposed slots in said frame and adjustable guide-rolls mounted in said slots to engage the cylinders of varying size at substantially diametrical points to guide the same.

20. In combination, a frame, a vertical roll in said frame, a cap formed with a bearing to engage one end of said roll, a cap-cylinder sleeved to said cap, a cap-piston operating in said cylinder and a guide-groove to be engaged by said cap to swing said cap out of line with said roll after it is raised clear of the same.

21. In combination, a frame, a vertical roll in said frame, a cap formed with a journal to engage the upper end of said roll, means revolubly connected with said cap to raise the same and means to swing said cap out of line with said roll after it is raised clear of the same.

THOMAS F. ROWLAND.

Witnesses:
  CHAS. BRADLEY ROWLAND,
  W. WEST.